United States Patent [19]

Watters et al.

[11] Patent Number: 4,959,860
[45] Date of Patent: Sep. 25, 1990

[54] POWER-ON PASSWORD FUNCTIONS FOR COMPUTER SYSTEM

[75] Inventors: Jeffrey S. Watters; Norman P. Brown; James H. Nuckols, all of Houston, Tex.

[73] Assignee: Compaq Computer Corporation, Houston, Tex.

[21] Appl. No.: 307,402

[22] Filed: Feb. 7, 1989

[51] Int. Cl.$^5$ .............................................. H04L 9/00
[52] U.S. Cl. .......................................... 380/4; 380/25
[58] Field of Search ...................................... 380/4, 25

[56] References Cited

U.S. PATENT DOCUMENTS

3,890,601  6/1975  Pietrolewicz ........................ 380/25
4,800,590  1/1989  Vaughan ............................. 380/25

Primary Examiner—Thomas H. Tarcza
Assistant Examiner—David Cain
Attorney, Agent, or Firm—Arnold, White & Durkee

[57] ABSTRACT

A power-on password security function for a digital computer system allows the system software to distinguish between authorized and unauthorized users. Safeguards are made against corruption of password data which could lead to lock-out authorized users, and redundant checks allow the security function to operate even when first-level checks fail. The battery-powered RAM storage area used to hold the password when the system is turned "off" is protected against being accessible by unauthorized users when the system is turned "on".

20 Claims, 6 Drawing Sheets

POWER-ON PASSWORD FUNCTIONS FOR COMPUTER SYSTEM

BACKGROUND OF THE INVENTION

The present invention relates to digital computer systems, and more particularly relates to password-type security measures to restrict user access to a system.

A computer usually contains valuable, confidential or otherwise restricted information in its memory and/or external storage devices, so it is accordingly desirable to control access to this information to prevent unauthorized use. Such controlled access to computer data may be realized either by providing physical (hardware) means for preventing the use of the computer itself or I/O devices on a computer system, or by provuding software means for restricting access, such as a routine that confirms a user's knowledge of a password before granting that user access to information contained in the computer system.

It is also necessary to restrict user input to a computer from a keyboard when the computer is functioning as a "network server", coordinating communication between multiple computers, terminals and/or other devices by a local area network (LAN). When functioning as a network server, a computer is dedicated to the execution of network software, in order to provide efficient, uninterrupted service to numerous network devices. If the keyboard of a network server is not disabled when the network operator is not present, an unrestricted user could potentially gain access to normally restricted files, or cause network communication to be disrupted.

One commonly-used method for restricting user interaction with a computer is to provide a "password lock" function, executed in the CPU itself or executed in the keyboard controller. Typically, when a keyboard controller is-in "password lock mode", no communication between the keyboard and the CPU of the computer is allowed unless a password is first entered to remove the controller from "password lock mode". One type of computer having this password lock function is the IBM PS/2 desktop models. If such a function is implemented in a peripheral device controller of a computer, however, it may prevent proper execution of software which requires communication with the locked-out external devices. For example, operating system software may require information about which devices are present in a computer system in order to determine the current system configuraton. In copending application Ser. No. 307,404, filed Feb. 7, 1989, now U.S. Pat. No. 4,942,606, issued 7/17/90, assigned to Compaq Computer Corporation, an improved keyboard password method is disclosed which permits certain types of commands and data to be transferred between CPU and controller, even in lock-out mode.

A password function is commonly included in the power-on or boot-up routines executed by the CPU when the power switch is turned on. This is to prevent an unauthorized user from being able to defeat the password by rebooting, as well as to prevent access to unattended systems. To this end, a password is stored in a location which is non-volatile, i.e., survives when power is off, and also not accessible to an unauthorized user when power is on so the password cannot be copied then used later. Preferably, the code for this power-on password function is stored in ROM, rather than on the hard disk, so unauthorized access cannot be achieved by forcing a boot from a floppy disk, or by reading the code from the hard disk while the system is operating. For these reasons, power-on password functions have been implemented, as on the IBM PS/2 type of desktop business computers, using non-volatile RAM to store the password, and bootup ROM space to store the code to perform the password routine. A particular device commonly used for this non-volatile RAM is a CMOS RAM with a built-in lithium battery, constructed as part of a clock/calendar chip, commercialy available as part number MC146818 from Motorola Semiconductor Products Corporation. This device uses a crystal oscillator and counter circuitry to maintain real time so the operating system of the computer can read registers in the CMOS RAM upon boot-up to enter the time and date. The CMOS RAM part of the chip has extra registers, not needed for the clock/calendar functions, used for holding system configuration data which is also accessed at boot-up so the operating system can define the particular system as it exists. In these additional registers, prior systems have also stored the password data for a power-on password function. When the computer is turned on, machine-language code in the startup ROM part of memory is executed, requiring the user to input the password, and the user's input is compared to the password stored in the CMOS RAM. If the passwords match, the remaining startup code is executed, and the system becomes operational. If the passwords do not match, however, startup execution is halted and the system is left inoperable, thus preventing unauthorized use of the system.

It is a principle object of this invention to provide an improved implementation of a power-on password mechanism for a desk-top or personal computer, or the like. It is another object of this invention to reliably prevent unauthorized access to a computer, and at the same time ensure that an authorized user (one who knows the password) will, after inputting the password, be granted access to the fully operational computer. It is a further object of the present invention to provide means for restricting access to the area of the CMOS memory that holds the power-on password, even after the computer has been made fully operational, so that the password cannot be revealed to or changed by an unauthorized user (one who does not know the password).

SUMMARY OF THE INVENTION

According to the present invention, the RAM storage in a battery-powered CMOS clock/calendar device is used to hold the bytes of a user-defined password. In addition, the RAM holds redundant error-checking bytes used to increase the reliability and effectiveness of the password security function. Another feature of the present invention is a method for preventing unauthorized access to the password information in the CMOS RAM device; specifically, a previously unused location in the CPU I/O address space is used to hold a "lock bit" which, when set, prevents the computer from reading or writing to the particular area in the CMOS RAM which holds the password bytes.

BRIEF DESCRIPTION OF THE DRAWINGS

The novel features believed characteristic of the invention are set forth in the appended claims. The invention itself, however, as well as other features and advantages thereof, will be best understood by reference to a detailed description of a specific embodiment, when read in conjunction with the accompanying drawing, wherein:

DETAILED DESCRIPTION OF SPECIFIC EMBODIMENT

Figure 1:
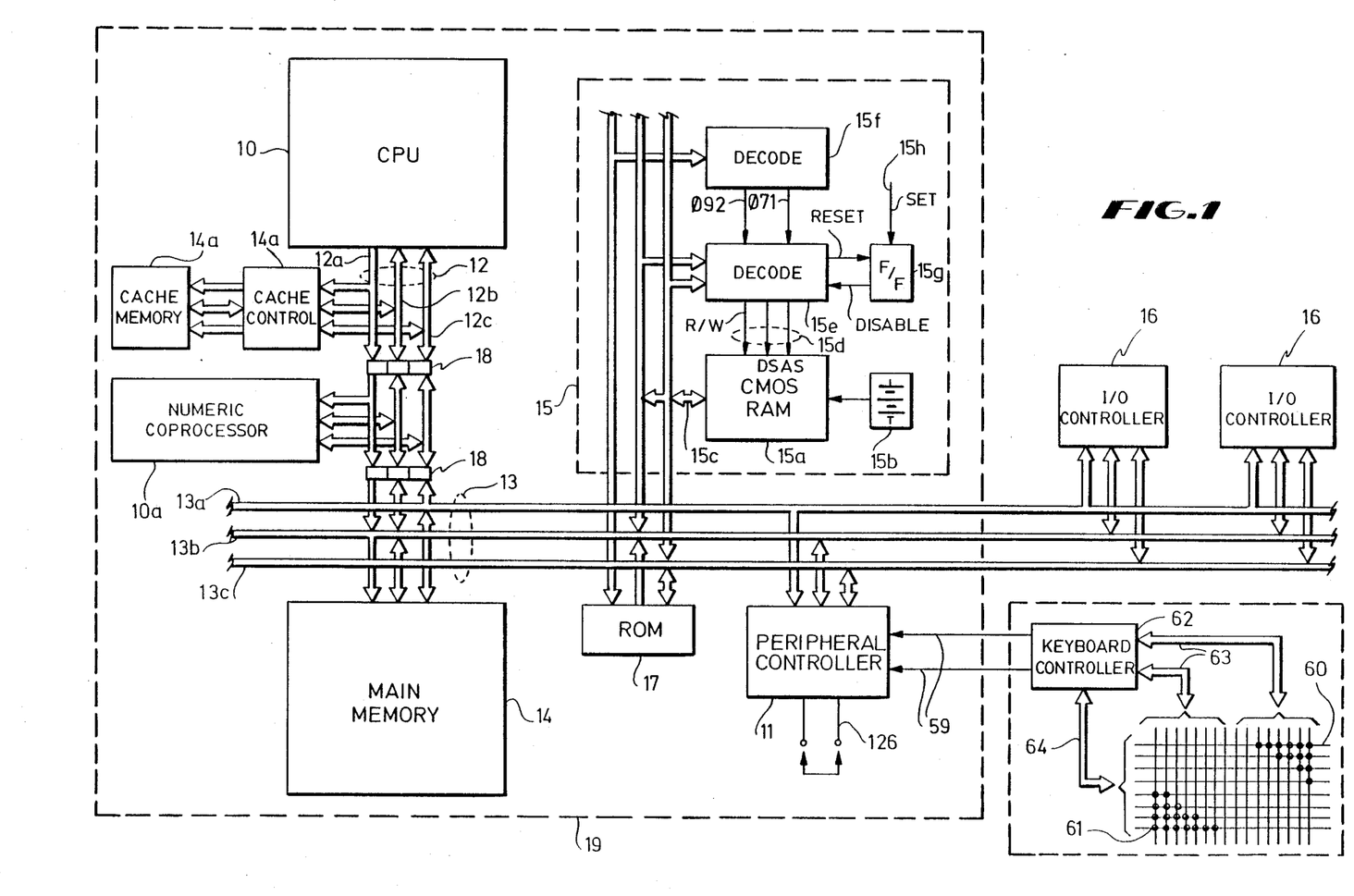
FIG. 1 is an electrical diagram in block form of a computer system which uses features of the invention.

Referring to FIG. 1, a digital computer system which may use features of the invention is illustrated. This system includes a CPU 10 which in a preferred embodiment is an Intel 80386 32-bit microprocessor, or an Intel 80386SX 32-bit microprocessor with 16-bit external data bus may be used. Of course, the features of the invention are applicable to computer system using other types of microprocessor chips or CPUs. Two different kinds of password protection are available in this system; after the system is up and running, a password mode may be entered when the computer is to be left unattended, according to the above-identified copending application Ser. No. 307,404, where a password entered at the keyboard is compared to a password loaded by the CPU 10 to a peripheral controller device 11 used to interface the CPU with a keyboard. The other kind of password protection, implemented at power-on according to the present invention, also responds to a password entered by the keyboard through the peripheral controller 11 but it uses code executed by the CPU 10 fetched from a start-up ROM, rather than by code in the controller 11 itself.

The microprocessor or CPU 10 is connected by a local bus 12 to a system bus 13 which logically connects the various components of the system, including the peripheral controller 11 and CPU 10. If a 80386 CPU chip is used, the local bus 12 and the system bus 13 include up to thirty-two address lines 12a or 13a (although only twenty-four are used in current systems because there is no need for this amount of physical address space), thirty-two data lines 12b or 13b and a number of control lines 12c or 13c. On the other hand, if an 80386SX device is used, the address busses 12a and 13a are 24-bits, and the data busses 12b and 13b are 16-bits wide. Also present in the system is a main memory module 14 which is in a logical address space of 4-gigabytes for an 80386 or 16-Mbytes for an 80386SX, although usually about 1-Mbyte is physically present.

According to the invention, a password is stored in a CMOS RAM device 15, which has its own lithium battery to maintain the data when the system power is off; this device also contains a clock/calender to provide time and date to the operating system upon boot-up. As noted above, this device 15 is, in this embodiment, a Motorola part number MC146818.

The system also includes a number of other input/output (I/O) devices 16, such as video display devices, network adapters or modems, and disk drives, for providing facilities for user interaction with the system, or for providing additional bulk-storage facilities for the system. Usually, part of the code executed upon start-up is accessed through one of the I/O devices 16 which is a hard disk controller, but the password function of the invention is executed from ROM in the early part of the start-up routines rather than using code accessed from the hard disk. To this end, ROM storage 17, consisting of a number of ROM devices, is connected to the system bus 13 to be accessible from the CPU 10 immediately upon power-on.

The busses 12 and 13 can be controlled by different devices, at the same time; the processor 10 can be accessing a cache controller and cache memory 14a, and-/or numeric coprocessor 10a on the local bus 12, while a disk drive operated by one of the controllers 16 is transferring data to the main memory 14 using DMA. To this end, the local bus 12 is separated from the system bus 13 by buffers or latches 18 operated by a controller receiving the control bus signals and bus arbitration signals. In this manner, addresses and data, and corresponding control signals, are not applied to the system bus, even though present at the CPU output, unless the controller has received the proper commands and has ownership of the system bus. Likewise, data on the system bus is not allowed onto the local CPU bus until the controller sees the proper commands from the CPU. In this manner, the CPU 10 can communicate with other devices on the local bus 12 without tying up the system bus 13.

The CPU 10, peripheral controller 11, main memory 14, ROM 17, CMOS RAM 15, and numeric coprocessor and/or cache memory and cache controller (if present in the system) are all mounted on a motherboard 19. Other components of the system such as the main power supply, disk drives network adapter or modem, etc., are mounted in the same housing as the motherboard, but in separate assemblies or on separate boards, in typical systems. Usually, the video display and keyboard are external to this housing. Supply voltages to all of the components on the motherboard 19 and otherwise included in the system of FIG. 1 is provided from a power supply in the same housing, and power-on as referred to herein means that a power switch to this power supply is closed.

In the CMOS RAM circuitry 15, also mounted on the motherboard 19, is the CMOS RAM 15a itself, which is the Motorola part MC18618 in the illustrative embodiment, along with its lithium battery 15b. This RAM device has a multiplexed 8-bit address/data input/output port 15c which is connected to the low order 8-bit portion of the system data bus 12b. The RAM 15a contains registers accessible for read or write by asserting an address on the bus 15c in one cycle, which is latched into an address register in the RAM, then reading from or writing to the selected register on the next cycle using the same bus 15c. Three control signals on lines 15d define this operation; an address strobe AS latches the address in the first cycle, then a data strobe DS and a R/W# select read or write in the next cycle. A pair of decoders 15e and 15f connected to the system address and data busses 13a and 13b generate these controls 15d for the RAM 15a, when the CPU 10 executes certain I/O access cycles, as will be explained. For security, access to the password stored in the RAM 15a can be prevented after the power-on routine has been completed, by a latch 15g which is set by a preselected I/O access from the CPU 10 then cannot be reset except by a signal 15h generated only at power-on.

Figure 2:
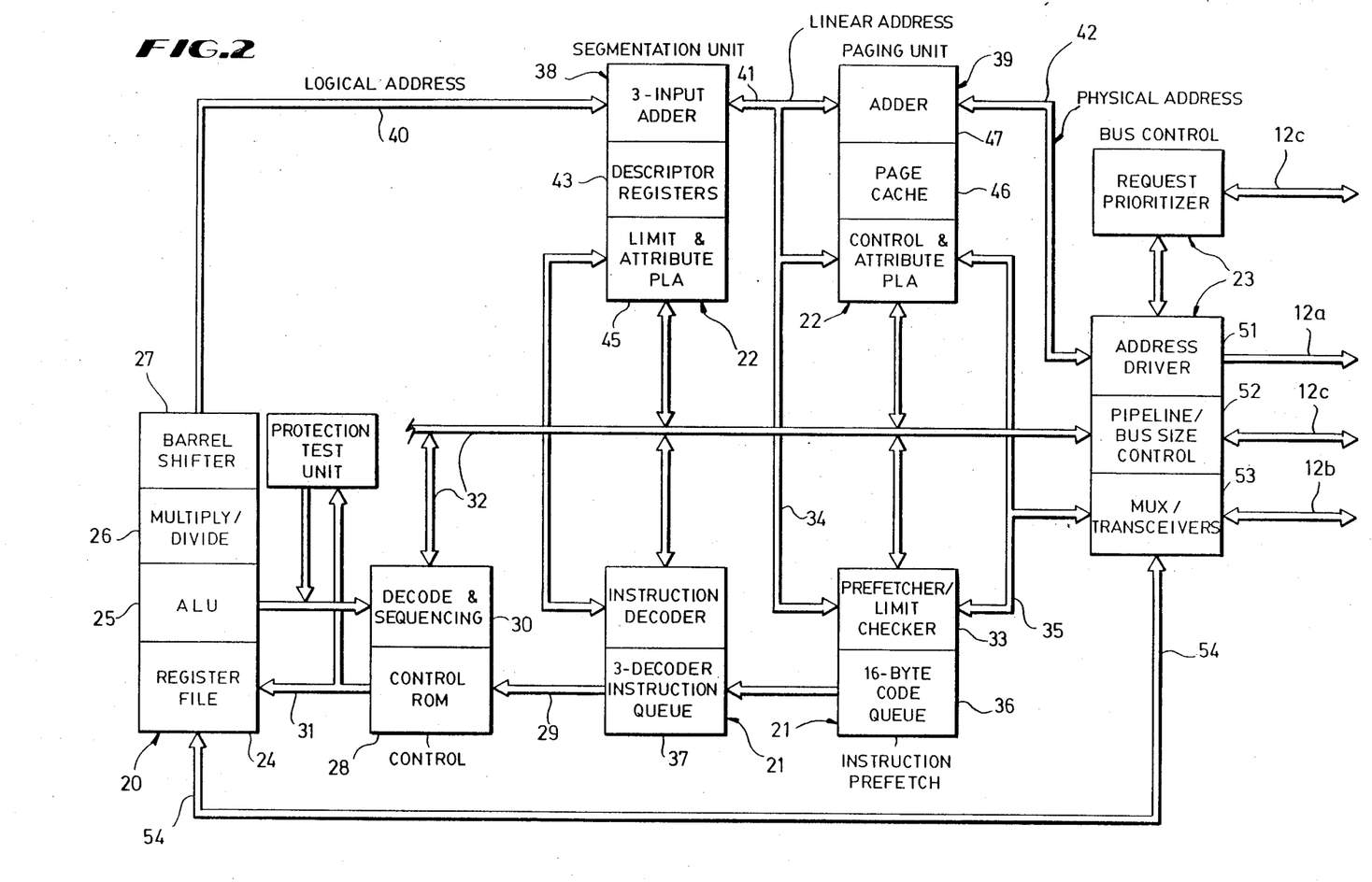
FIG. 2 is an electrical diagram in block form of the CPU of the system of FIG. 1.

Referring to FIG. 2, the CPU 10 of the 80386 or 80386SX type used in the illustrative embodiment is a high performance microprocessor including an on-chip memory management unit providing virtual memory support. The microprocessor is of the microcoded type, using "pipelining" or overlapped instruction execution, and generally includes an execution unit 20, an instruction unit 21, a memory management unit 22, and a bus interface unit 23. The internal data paths are 32-bit for either device, but the 80386SX has a 16-bit external data bus 12b while the 80386 has a 32-bit external data bus 12b.

The execution unit 20 performs arithmetic and logic operations on operands and addresses fetched from memory 14 or I/O space. The execution unit includes a register file 24 containing a number of general purpose 32-bit registers for holding operands and results, as well as addresses to memory or I/O space. In the unit 20, a 32-bit wide ALU 25 performs the arithmetic or logic operation defined by an instruction; a multiplying/divide circuit 26 executes certain instructions using multiply or divide, and a barrel shifter 27 can execute 0-to-64 bit shifts on data being inputted to the ALU. Microinstructions stored in a control ROM 28 define the operations performed in the execution unit. The microinstruction routines are selected by an entry point derived from the current instruction and applied to an input 29, and the microcode sequence within a routine is determined by a sequencer 30, based upon a microaddress produced by the last microinstruction and conditions within the processor. Control signals produced by a microinstruction are applied to the execution unit 20 via bus 31, and to the other units of the CPU chip via internal control bus 32.

The instruction unit 21 functions to fetch and decode instructions of the instruction stream. A prefetch unit 33 outputs addresses via bus 34 through the memory management unit 22 and the external address bus 12a to the memory 14 or ROM 17, and receives instructions back via external data bus 12b and bus 35, to fill an instruction queue 36 with the next sixteen bytes in the instruction stream, based upon an instruction pointer in the register file 24. An instruction consists of an opcode of one or two bytes, usually followed by one or more bytes of mode specifiers, address displacements and/or immediate data, so an instruction can be from one byte to six or eith or moe bytes in length. A decode unit 37 receives instructions from the queue 36, decodes the opcodes to generate entry point addresses for the control ROM 28, and determines what bytes are specifiers, displacements or immediate data and transfers the appropriate information to the other units of the processor; this decode is three-deep, i.e., the next three decoded instructions are being processed at one time. This instruction unit is where the I/O instructions used to access the CMOS RAM 15 or the peripheral controller 11 are recognized upon being initially decoded, so the distinction between memory access and I/O access can be implemented.

Figure 3:
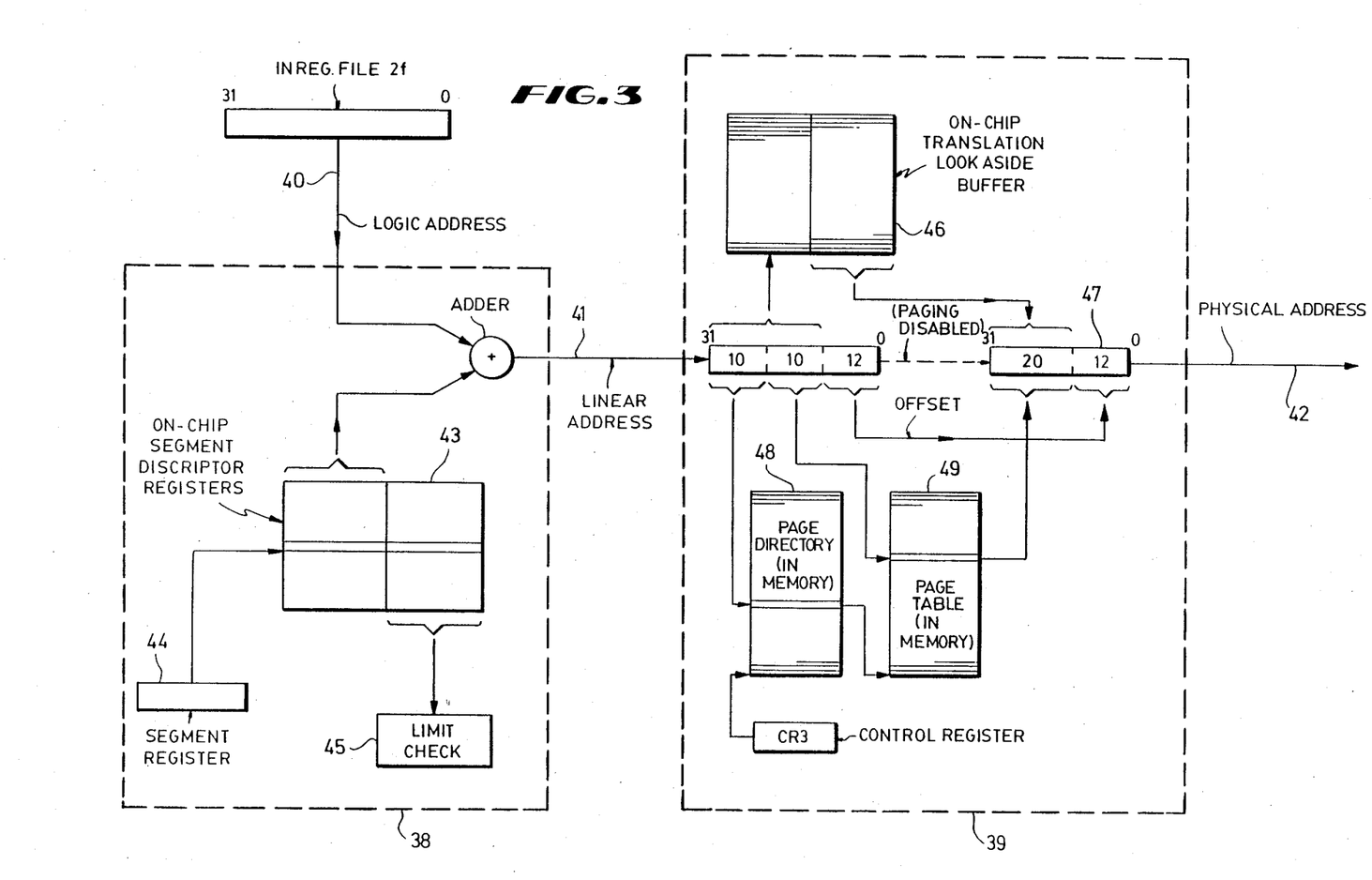
FIG. 3 is an schematic representation of the memory management scheme used in the CPU of FIG. 2.

The memory management unit 22 of the CPU 10 of FIG. 2 includes a segmentation unit 38 and a paging unit 39 used for accessing memory 14 or ROM 17, but not I/O devices 16, CMOS RAM 15 or controller 15. A 32-bit logical address produced on bus 40 by the execution unit 20 is translated by the segmentation unit 38 into a 32-bit linear address on bus 41, and then translated into a 32-bit physical address on bus 42 by the paging unit 39. Referring to FIG. 3, the segmentation unit 38 adds the logical address on bus 40 to a base address from segment descriptor registers 43; one of te descriptor registers 43 is selected by the contents of a segment register 44. The segment descriptors contain not only the base address for the segment, but also the limits of the segment (its size) and the level of protection. The sum of the logical address on bus 40 and the base address for the segment, if the limit and attribute checker 45 in the segmentation unit finds the address to be proper, becomes the linear address on bus 41. If paging is disabled, this linear address passes through the paging unit 39 without change and becomes the physical address on bus 42. If paging is enabled, the linear address is first tested to see if the page address is found in a page cache 46 (a set associative translation lookaside buffer); bits 13–31 of the 32-bit linear address are compared to the thirty-two most recently used page addresses stored in the cache 46, and if a match is found the page address for this entry is forwarded to an adder 47 which produces the physical address on bus 42 using the page address and the lower 12-bit offset from the linear address. If the page is not found in the cache 46 (the hit rate is perhaps 98%), the page must be looked up in a page directory 48 and a page table 49 which are stored in memory 14. The upper 10-bit part of the 32-bit linear address is used to select 1-of-1024 entries in the page directory 48, producing the base address of the page table 49, then the next 10-bit part of the linear address is used to select 1-of-1024 of the entries of this page table, producing the translated page address used as an input to the adder 47 as before. The page entries have protection bits, similar to the segment entries, so several modes of protection are available. The segmentation and paging units 38 and 39 are used to translate addresses to memory 14 or ROM 17, but not I/O addresses, however, so when the peripheral controller 11 or CMOS ROM 15 are addressed to transfer data, commands or operands this is always at fixed physical addresses in the I/O space. However, the code from ROM 17 executed to implement the power-on password function of the invention may be protected by the some level of protection provided by the memory management system 22, so that an unauthorized user cannot defeat the password function by examining the code while the computer is operational, then later gain access when the machine is unattended by defeating the functions of the code.

The bus interface unit 23 includes an address driver 51 functioning to generate the 24-bit or 32-bit address on external bus 12a along with the byte-enable bits BE0-BE3 (for 80386 devices, not 80386SX) which are part of the control bus 12c. When a new valid address is driven onto the bus 12a, an address status line ADS# is asserted in the control bus 12c. The outgoing addresses may be pipelined if a next-address signal NA# is asserted in control bus 12c by an external device; instead of waiting until a Ready line is asserted to produce the next address, a pipeline control circuit 52 produces a new address every cycle from the driver 51 if it has received the NA# signal. All incoming and outgoing data is controlled by multiplexer/transceivers 53 connected to the external data bus 12b. Data to or from the execution unit 20 is coupled to the transceiver 53 via bus 54, or instruction stream data to fill the queue 36 is coupled from transceiver 53 via bus 35. Interrupts and bus arbitration are handled by a request prioritizer 55 which receives HLDA, INTR, NMI, ERROR# and BUSY# signals from the control bus 12c, and generates HOLD signals to the control bus 12c. Definitions of these control bus signals are contained in Table A.

The microprocessor of FIG. 2 is pipelined in that during a given machine cycle several instructions are executing at various stages at the same time. An instruction loaded to the prefetch queue 36 in one machine cycle will be decoded in the unit 37 in the next machine cycle, generating a microinstruction output from the control ROM 28 in a third cycle, causing the execution unit 20 to perform some operation in a fourth cycle, then the result is written to a register of the file 24 in a fifth cycle. Of course, execution of other instructions overlap this instruction.

In the embodiment of FIG. 1, the interface with the keyboard uses a peripheral controller 11 which is an Intel 8042 Universal Peripheral Interface, a microprocessor device commercially available from Intel Corporation. This controller is used to implement the interface between the host processor 10 and external devices, in this case an alphanumeric keyboard 57. The interface between the keyboard 57 and the microprocessor or controller 11 consists of lines 59 which include a serial data line and a single control line called TEST0 which is an input to the controller 11 indicating when the keyboard has data to send. The peripheral interface microprocessor 11 has 8-bit data in and data-out registers, and certain control lines, connected to the shared system bus 13. The host processor 10 communicates with the peripheral controller 11 and the keyboard 57 via an I/O port; that is, a specified address in the I/O address space of the processor 10 is reserved as a data port used for communication between the CPU 10 and with the keyboard 57. When the host processor 10 executes an I/O read or write instruction to this specified I/O address, a decoder detects this address on the system address bus 13a and causes the microprocessor 11 to be selected and activated, sending or receiving commands or data on data bus 13b via the 8-bit data-in and data-out registers of the controller 11. For example, the command from the host processor 10 which causes the microprocessor or controller 11 to enter "keyboard lock mode" as set forth in the above-identified copending application Ser. No. 307,404, is issued in this way; an applications program executed in the CPU 10 initially asks the user to select a password, which is entered by the keyboard 57, then this password is stored by the CPU 10 in RAM as well as in the controller 11, so thereafter upon entering a proper keycode sequence the user can place the system in keyboard lock-out mode, at which time the CPU sends the command to enter this mode to the controller 11.

Referring to FIG. 1, the keyboard 17 includes a key matrix 60 consisting of rows and columns of keyswitches 61. In a typical desktop comuter there would be perhaps 101 keys on the keyboard. A keyboard controller device 62 performs the function of determining when a key is depressed and which key is depressed. The column lines of the matrix are connected to one set of ports 63 of the controller 62, and the row lines are connected to another port 64; a definition of which key is down is available from the row and column information at these ports 63 and 64. The controller 62 is a microprocessor device having a program stored in ROM or EPROM, like the controller 11; usually a microprocessor device such as commercially available under the part numbers 8051 or 8048, manufactured by Intel Corporation, is used for this controller 62. The stored program performs the function of scanning or polling the keyboard matrix 60 and generating an 8-bit keycode for each key as it is depressed. These keycodes are buffered in a 128-byte RAM within the controller 62, and are transferred to the peripheral controller 11 upon request, and thus to the CPU 10. The controller 62 generates a TEST0 input to the controller 11, then the controller 11 sends a command back to the controller 62 when ready to receive keycode data. The keyscan or polling thus goes on independently of and transparent to the CPU 10 and the peripheral controller 11, but when a key is depressed and a keycode is ready to be sent from the controller 62, the controller 11 and then the CPU 10 are in control of the transfer.

Figure 4:
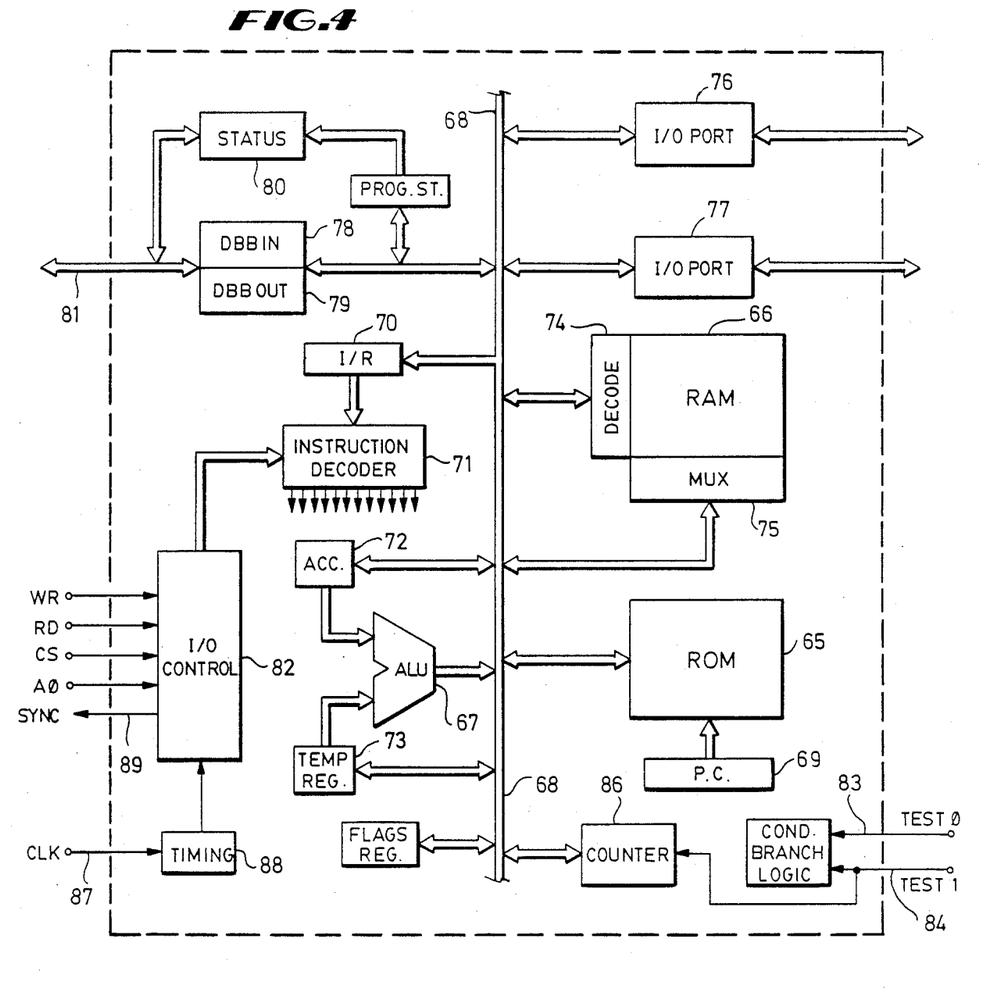
FIG. 4 is an electrical diagram in block form of internal details of a peripheral controller chip which may be used in the system of FIGS. 1 and 2.

Referring now to FIG. 4, the peripheral controller 11 is shown in more detail. This device is a processor executing instruction code stored in an internal ROM or EPROM 65 of about 1K- or 2K-byte, and has a 128- or 256-byte internal RAM 66, an 8-bit wide ALU 67 and an 8-bit internal bus 68. Instructions are fetched from ROM 65 using a program counter 69 for addressing, and loaded into an instruction register 70 then decoded by instruction decoder 71 which generates control signals to define the operation of the device. The two inputs of the ALU are loaded from an accumulator register 72 and a temporary register 73, both coupled to the internal bus 68. The RAM 66 contains a register file, stack and data storage, and is addressed by a decoder 74 and multiplexer 75, also coupled to the internal bus 68. Two 8-bit I/O ports 76 and 77 connected to output terminals of the device are coupled to the internal bus 68, and are loaded and unloaded under instruction control. The interface to the CPU 10 uses a pair of data buffers 78 and 79 and a status register 80, all three of which are coupled to an 8-bit data I/O port 81 which is connected to the system data bus 13b. The data bus buffer registers 78 and 79, referred to as DBBOUT and DBBIN, are loaded or read by the controller 11 from the internal bus 68, by executing instructions from ROM 65; loading or reading these data bus buffers from the CPU 10 is controlled by lines of the control bus 13c connected to controller 82. These control lines include a write control WR, a read control RD, chip select CS and address line A0, as defined below. The TEST0 and TEST1 inputs 83 and 84 to the chip are connected to conditional branch logic circuitry 85, which produces an input to the decode and control circuitry 71 and 82 when a conditional branch instruction is executed. The conditional branch logic 85 also receives inputs representing ALU operation such as carry, contents of accumulator 72 equal zero, etc., as well as the condition of the data bus input and output buffers 78 and 79. An 8-bit timer or event counter circuit 86 is connected to count clock cycles (divided by thirty-two), or to count external events by an input from the Test1 pin, and also produces an output to set a timer flag which is testable by the conditional branch logic 85 so that a branch instruction can be conditional upon overflow of the counter 86. Also, overflow of the counter 86 generates an interrupt by input to the decode and control circuitry 71, 82, which is enabled or disabled under program control. The counter register 86 may be loaded from or to the accumulator 72 via the internal bus 68. The processor 11 is synched to the host CPU 10 by clock inputs 87 to a timing circuit 88, and produces a synch output 89 to the keyboard controller 62, so both of these peripheral processors 11 and 62 are running synchronously with the main processor 10. The controller 11 of FIG. 4 executes the instruction set of Table B (as well as other instructions not material to the present invention).

Figure 5:
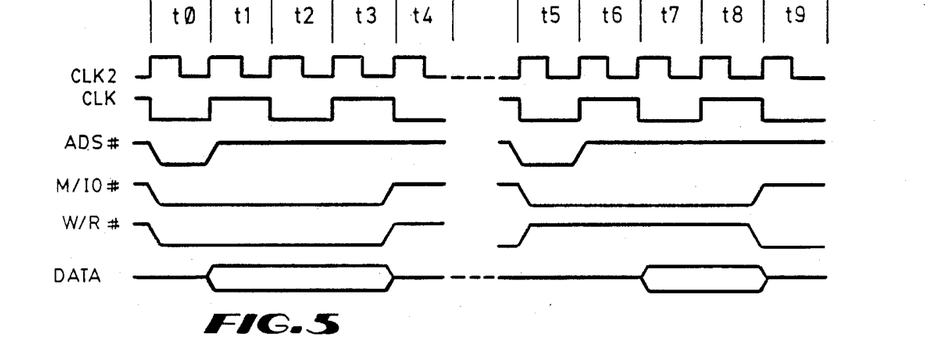
FIG. 5 is a timing diagram of voltage or events vs. time for read and write cycles performed by the CPU to access the peripheral controller 11 of FIGS. 1, 2 and 4.

Referring to FIG. 5, an I/O write bus cycle is illustrated in which the CPU 10 writes a command or data to the data input register 78 of the controller 11, or writes an address to the CMOS RAM 15a, for example. During the first Clk cycle, t0, the address strobe ADS# is asserted on bus 12c by the CPU 10 along with the control signals M/IO# and W/R# indicating this to be a write to I/O space; at the same time, certain other address bits are driven high by the CPU 10 on bus 12a and detected at an address decoder for the controller 11 at input CS#, indicating the address of the register 78 in I/O space, or detected at decoder 15f, indicating access to the CMOS RAM. Data is driven onto bus 12b by the CPU 10 during the period t1-t3. This write request is asserted or "posted" onto the system bus 13; the CPU 10 does not wait for any acknowledge that the write operation was completed, but instead continues with another cycle. Assuming the system bus 13 is free, the posted write is carried out immediately. It is in this manner that the password data stored in the CMOS RAM 15 is loaded to the controller 11, or other data or commands are issued to the controller; likewise, it is in this manner that access to the CMOS RAM is initiated.

Also shown in FIG. 5 is a read cycle, where the CPU 10 performs a read of the I/O address where the data bus buffer 79 of the controller 11 is defined to reside, or reads the I/O location where the RAM 15a resides (via bus 15c). During t5, the ADS#, M/IO#, A0, and chip select CS# are the same as for a write, but the W/R# signal on bus 12c is low, initiating a read operation. By external logic (not shown) the W/R# signal on control bus 12c and 13c is converted to separate W# and R# controls for the controller 11, or, for the RAM 15a, the decoder 15e produces the controls on lines 15d. Again, assuming the bus 13 is free, this read request is asserted onto bus 13 at the same time as it reaches bus 12. In t6, the I/O control 82 in the controller 11 recognizes the read request and drives the data onto the output 81 during t7 and t8, or the RAM 15a drives the multiplexed bus 15a. The logic circuit which generates the separate R# and W# controls also generates a Ready# response to the CPU 10 to terminate the bus read cycle, since the controller 11 does not produce this signal.

Figure 6:
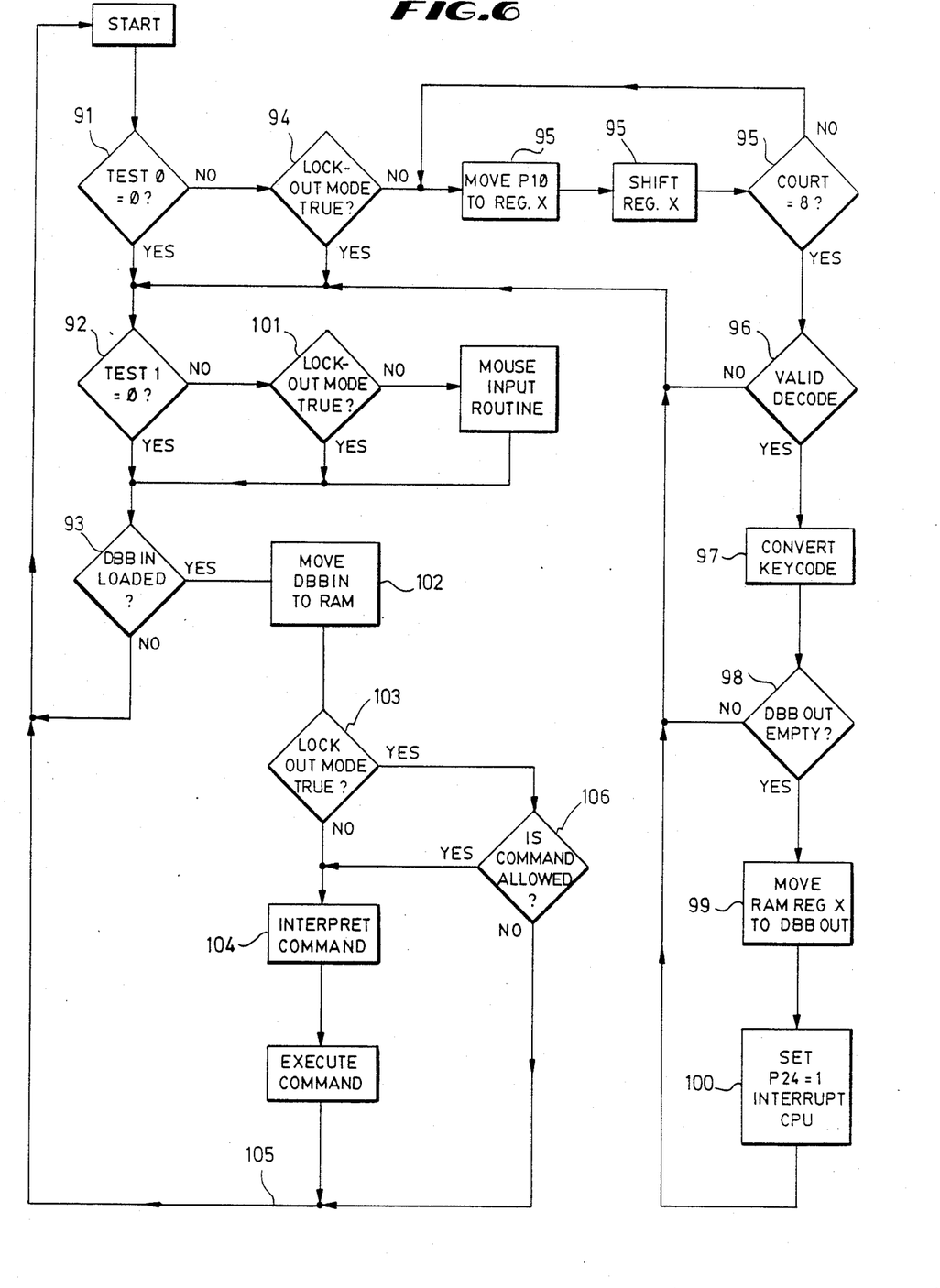
FIG. 6 is a logic flow chart of a program for keyboard input and keyboard lock-out in the peripheral controller of the system of FIGS. 1–4.

Referring to FIG. 6, a logic flow chart, in simplified form, of a part of an example of a program which may be stored in the ROM 65 and executed by the controller 11 is illustrated; this part of the program performs the keyboard lockout as set forth in the above-identified copending application Ser. No. 307,404, as well as keyboard input in general, such as for entering the password of the power-on password method of this invention. In an idle state, the controller 11 polls the TEST0 and TEST1 inputs 83 and 84 and the status register 80 in a loop to see if there is a keyboard or a mouse input, or if the CPU 10 has written to the data bus input buffer 79, as represented by the decision points 91, 92 and 93 of the flow chart; this loop is implemented using the instruction set of Table B, in known manner. If the TEST0 input is active at point 91, the program checks to see if the lock-out mode is activated at decision point 94, and if yes the sequence returns to the original loop at point 92, since the keyboard is to be ignored. If lock-out is not activated, then the controller 11 enters a loop where it reads its port P10 (one bit of the ports 76 and 77) for a count of eight and loads and shifts these bits to a register of RAM 66 as represented by the elements 95 of the flow chart. A table look-up is performed at point 96 to see if the 8-bit word read in is a valid key code; if not, the original polling loop is reentered, or if so then a code conversion is done at point 97 to produce the key codes used by the CPU 10, and the status of the data bus output buffer 79 is checked at point 98, and if empty this buffer 79 is loaded at point 99, and port terminal P24 (of I/O ports 76, 77) is set at point 100 to produce an interrupt INTR input to the CPU 10, by way of a standard interrupt controller chip, not shown. This interrupt will cause the CPU 10 to enter a routine to read the buffer 79 using a cycle as in FIG. 5. Although not illustrated here, the controller 11 can buffer several key codes in RAM 66 if the CPU 10 does not immediately respond to the interrupt; in some cases the CPU program will mask the keyboard interrupt while another task is being performed, e.g., refresh of the DRAM chips of main memory. After signalling the interrupt, the controller 11 returns to the polling loop at point 91. The polling loop has a similar input routine for the mouse input TEST1 as indicated at points 92 and 101. Data input to buffer 78 is found by checking status at point 93, and if true then at point 102 the data is moved to RAM 66 and the status of the lock-out mode is checked at point 103; if not in lock-out mode then the data is interpreted to see what action is needed as indicated by point 104, so if the input from the CPU 10 is a command then the required action is taken before return to the polling loop at point 105. If in lock-out mode, however, the input word is checked at point 106 to see if it is an allowed activity in lock-out. If not, the input is ignored and the polling loop is reentered at 105; if so then the usual interpretation and execution are performed.

The CPU 10 accesses I/O space by asserting the M/IO# line low, and driving an address in the range of zero-to-64K onto the bus 12a. All of the I/O modules 16, and other devices such as RAM 15 and controller 11 are mapped into this I/O address space, and all data is transferred between the CPU 10 and the these devices by I/O read and write operations using this address range. When an I/O-mapped device detects its reserved address being driven on the address bus lines 13a, and control signals on the control/power bus lines 13c indicate that this address refers to an I/O address location (as opposed to a main memory address) the I/O-mapped device either receives or sends data on the data bus lines 13b, depending upon whether the W/R# control line in bus 13c specifies an I/O read or an I/O write transaction. The CMOS RAM 15 is mapped in this I/O space.

The I/O-mapped CMOS RAM 15 included in the system of FIG. 1 is used to hold date, time, system configuration information, as well as password information used in the implementation of the power-on password security scheme of this embodiment of the present invention. The internal lithium battery 15b allows data in the RAM 15a to be preserved when the system power supply is turned off. In the preferred embodiment, the RAM 15a is part of the Motorola MC146818 device which has a 64-byte data storage space. I/O address location 000071(hex) is reserved as the data port for communication with this 64-byte space in the RAM 15a. The CPU 10 reads the current time or date from the RAM 15a by driving the address 000071(hex) on the system address lines 12a and 13a, specifying an I/O operation by M/IO#, and specifying on the data bus 12b and 13b the appropriate internal RAM address (zero-to-64) of the location of the time or date registers. The decode circuit 15f detects the 000071(hex) address and drives the decoder 15e to produce the address strobe AS to the RAM 15a, and the internal RAM address is captured from the data bus 13b via bus 15c and used by the RAM 15a to select 1-of-64 of its storage locations for access (between 000000 and 00003F(hex)) for either write or read from this location, as instructed by control signal W/R# on the control bus 13c.

Since the CMOS RAM 15a contains privileged password information, this embodiment of the present invention provides the function of restricting both read and write access to the portion of the CMOS RAM 15a which contains the password bytes. To this end, an additional word is mapped into a formerly unused location (namely 000092(hex)) in the I/O address space of the CPU 10, implemented as the one-bit register or flip-flop 15g in control circuitry for the RAM 15a. This control circuitry detects the address 000092 via decoder 15f for toggling this bit. The value of bit-3 in a word written to data bus 13b at this I/O space address is used to dictate the enabling of a protection mechanism for the portion of the CMOS RAM 15a that contains the password bytes. When bit-3 of I/O location 000092(hex) is set, the control circuitry including decoders 15e and 15f does not allow any access to the top ten locations in the CMOS RAM 15, where the password information is stored. This protection bit is realized in the form of the single D flip-flop 15g. When the decoder 15f detects the I/O address 000092(hex) being driven on the system address lines 13a, bit-3 on the system data bus 13b sets this flip-flop. When the bit is set the control circuitry does not allow any read or write access to the top ten locations (000036 through 00003F(hex)) of the CMOS RAM 15.

Figure 7:
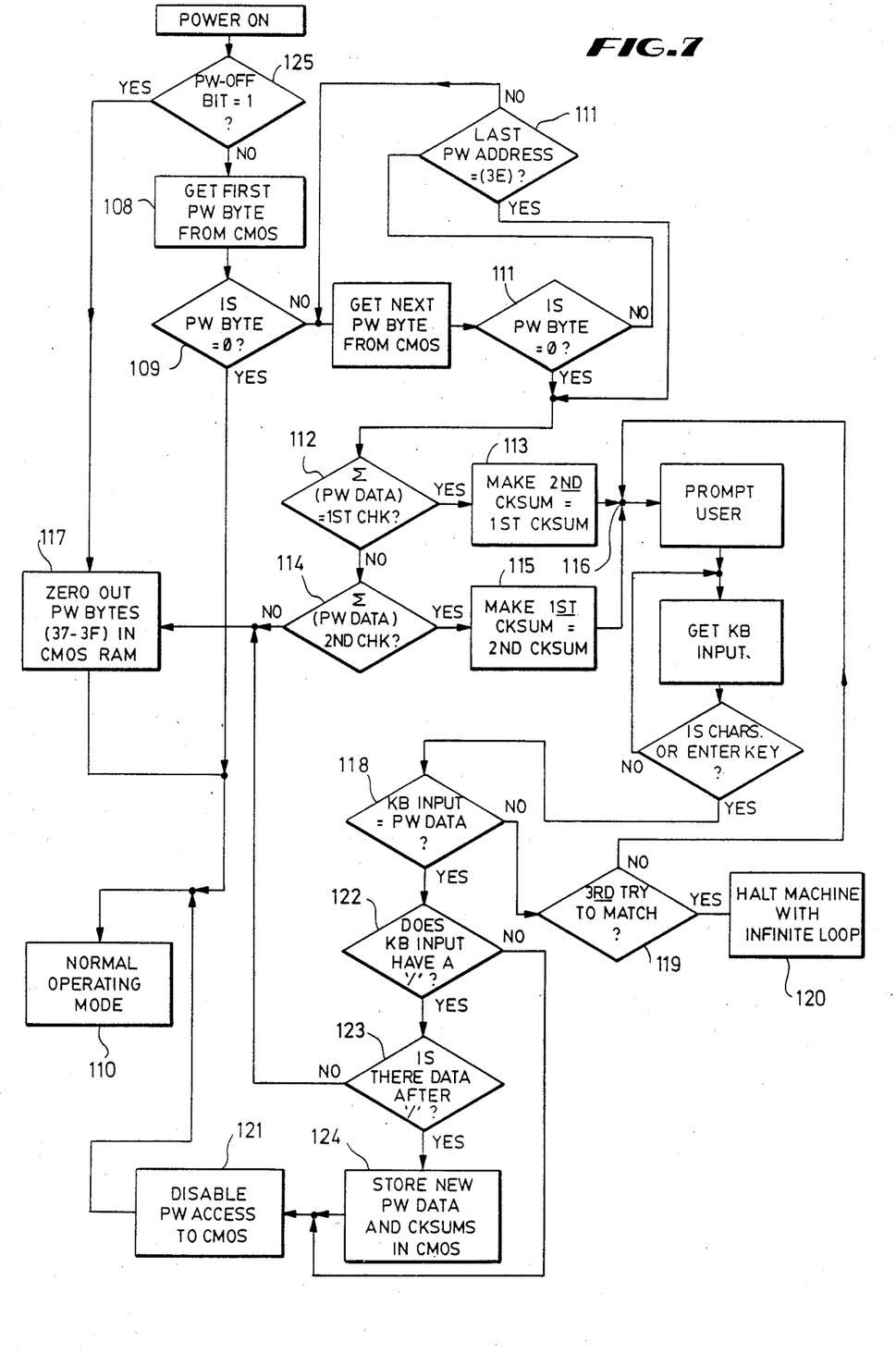
FIG. 7 is a logic flow chart of a program for power-on password functions in the system of FIG. 1, according to an embodiment of the invention.

Referring to FIG. 7, operation of the power-on password security function according to this embodiment is generally as follows: Upon system startup (when the external power supply is turned on), the power supply generates a power-on signal at a slight delay after the DC supply reaches a selected level, and this signal generates a RESET input to the CPU 10, causing the processor to its defined initial condition, where it begins executing machine code at a certain address, usually at a low memory location in the real address mode. In this case, the lowest segment of the processor main memory address space starting at the selected address is mapped to the startup ROM 17 on the motherboard 19. The code for implementing the power-on password security function is contained in this ROM 17, which of course cannot be modified by a user. Thus, the password function code will be among the first code executed each time the computer is turned on (after self-test routines and the usual initialization), and the computer will not become fully operational until this code has been executed. The logic flow chart of FIG. 7 is a simplified illustration of the type of algorithm useful in implementing the method of the invention, it being understood that the actual assembly code would be optimized by a skilled programmer to execute the method in a more efficient manner.

Initially, the D flip-flop or latch 15g in the control circuitry for RAM 15a is placed in a reset state by the power-on signal at line 15h, and the protected CMOS RAM locations of Table C can be accessed. The password function code in system ROM 17 as illustrated in FIG. 7 reads the first password byte in the CMOS RAM 15a starting at address 38(hex), using I/O reads in the manner described above, as indicated in block 108. Next, as indicated by decision point 109, the values of the first password byte read into register file 24 is checked to see if the byte is all zeros, in which case power-on password function has not been invoked by the owner, so if all zeros are found then the code goes immediately to the normal operating mode at point 110. If not all zeros, this means the owner has invoked power-on password, and so the next step is to read the remaining bytes of the password from the CMOS RAM until a zero is found or until the last address (3E) is reached, as indicated by the loop including decision points 111 in the flow chart. Then, the routine is entered to check the integrity of the password bytes, at decision point 112.

Table C lists the definitions of the nine bytes from the RAM 15a read into the register file 24 of the CPU at this point. Seven bytes (at addresses 000038(hex) through 00003E(hex) of the RAM 15a) are used to store a password of up to seven-byte length. Address 00003F(hex) holds a first "checksum" value which represents the arithmetic addition of the seven password bytes, and point 112 of FIG. 7 indicates that the code executed by the CPU 10 determines if the checksum value from location 00003F(hex) agrees with the addition of the one-to-seven password bytes read from RAM 15a. If not, it is assumed that either the checksum value or one or more of the password bytes has been corrupted, as would be the case, for example, if the battery power supply 15b for the RAM 15a failed, or, as has been found to be the case, the application of system power has inadvertently written data to the RAM locations due to the more or less random voltages appearing on the terminals of the CMOS RAM device when the voltage first comes up. If the password bytes were altered in any way without the intent or knowledge of the owner, access to the computer system would be denied. Therefore, if the processor 10 finds a discrepancy between the password and the checksum at point 111 while executing this startup code, it must zero out all of the password bytes in the RAM 15a and abort the power-on password function so the user is allowed to gain access to the system.

As an additional level of safeguarding, this embodiment of the present invention employs a second copy of the password checksum value to be kept in the CMOS RAM 15a, at location 000037(hex). The processor 10 thus confirms the validity of a password in the following manner: First, the processor adds all the password bytes together and checks the result against the first checksum value in location 00003F(hex), as described above, indicated at point 112. If the two values match, the password is known (to at least a high degree of certainty) to be valid and uncorrupted, so this good checksum is copied to the second checksum location 000037 for security against later corruption of the first checksum, as indicated at step 113, and then keyboard entry of the password characters by the user can begin. If the two values do not match in this first try, however, the CPU 10 next compares the sum with the second checksum value in location 000037(hex), as indicated at decision point 114. If a match is found here, it is assumed that the first checksum value was in error, and so the second checksum (which is the good one) is copied over the first (bad) checksum, as indicated at block 115, and control goes to node 116 to begin the user's keyboard entry. If no match is found in this second comparison at decision point 114, however, the password function is aborted, the password bytes are zeroed out in the CMOS RAM 15a as indicated by procedure 117, and control goes to normal operating mode 110 so the user is granted access to the fully operational system, the assumption being that the password bytes or checksum have been corrupted by malfunction of the CMOS RAM device.

The redundancy in checksum comparisons is particularly useful in systems which utilize the MC146818 CMOS device, which is known to exhibit undesirable behavior with regard to its storage location (address 00003F(hex), where the first checksum is stored. Under certain circumstances, this device will corrupt the value stored in location 00003F(hex) when voltage is first applied to its power leads. With the second checksum comparison, this possibility is taken into account, and the power-on password function is more likely to be effective.

Once the processor 10 has determined that a valid password is stored in the RAM 15a, i.e., node 116 is reached, a loop is entered to prompt the user to enter a password via the alphanumeric keyboard 60, and the user's entry is transferred to the CPU 10 and stored in a buffer in response to interrupt-9 using the routine of FIG. 6; this continues until the user has either pressed the "enter" key or has inputted fifteen characters. Then the processor system, by code executed in the CPU 10, compares the password bytes in the buffer with the password byte reads from CMOS RAM 15a as indicated at decision point 118. If this comparison reveals a discrepancy, the code will let the user try two more times as indicated by the loop created by the decision point 119 returning control to node 116 for a new prompt. If the user does not enter the correct password in three tries, execution of ROM 17 startup code is halted, indicated by node 120, leaving the system inoperative. If all non-zero bytes match, control passes to the normal operating mode at 110, but if not the system-halt procedure 120 is entered upon any byte being wrong.

After confirming user authorization, however, the startup code in the ROM 17 illustrated in FIG. 7 directs the processor to disable access to the password bytes of Table C in the CMOS RAM 15a, as indicated by procedure 121. To do this, the processor writes a "one" to bit-3 of I/O location 000092(hex), as previously described. This causes the D flip-flop 15g to be set, no subsequent writes to location 000092(hex) are effective, and thus the disable function cannot be deasserted while the computer remains turned on.

If an authorized user wishes to change the password stored in the CMOS RAM 15a, he must do so before access to the locations of Table C is disabled at node 121. To support this change-password function, at decision point 122 of FIG. 7, the startup code in ROM 17 looks for a slash character ("/") to appear in the user-inputted password. The user would enter "XXXXX/YYYYY" where the old password is XXXXX and the new one is YYYYY. If a slash is detected, and there is data after the slash (detected at point 123), this new password is stored in the CMOS RAM by procedure 124 prior to disabling access to the top locations in the RAM 15a by procedure 121. If there are no characters entered after the slash, this is interpreted as meaning the user wishes to disable the password function, and control goes from decision point 123 to the procedure 117 to zero out the existing password the password, because after the access to the CMOS RAM 15a is disabled the password bytes cannot be changed.

The system of FIG. 1, executing the program of FIG. 7, also makes provision for disabling the power-on password function altogether, in cases when security is not required, or in cases where a user wishes to use the top locations in the CMOS RAM 15a for some other purpose. Within the physical housing of the computer itself on the motherboard 19 is a switch for this purpose, implemented by two pins, which when shorted together (as with a "jumper" wire), is detected at a decision point 125 before entering the execution of the power-on password startup code of FIG. 7. This switch is at a port terminal 126 of the peripheral controller 11 (two pins of a port 76 or 77), and so part of the code in the ROM 65 allows a function in which upon receiving a command from the CPU 10 the controller 11 reads this port terminal 126 and returns an indication to the CPU according to the result. That is, the start-up code of the CPU includes a routine indicated by the decision point 125 in FIG. 7 which checks the status of this jumper 126 by accessing the controller 11 via a defined command, and if shorted, the password check is totally bypassed, the procedure 117 for zeroing the password bytes in the CMOS RAM is entered, and control passes to normal operation at node 110. In the example embodiment, the computer housing is therefore preferably provided with a locking mechanism for preventing unauthorized users from shorting these pins and bypassing the power-on password security. When the power-on password function has been disabled in this manner, the top locations in CMOS RAM 15a can be used for other purposes, or can be written and then protected from subsequent access by writing a "one" to bit-3 of I/O location 000092(hex), as described above. Just as if the password function were enabled, however, once the top locations in the RAM 15a are protected, they will remain inaccessible until the computer is turned "off".

From the above detailed description of a specific embodiment of the present invention, it will be evident that a security scheme for preventing unauthorized use of a computer system has been disclosed which is both reliable and resistant to countermeasures.

While this invention has been described with reference to a specific embodiment, this description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments as fall within the true scope of the invention.

TABLE A

CONTROL BUS

M/IO#, D/C#, W/R# and LOCK# are cycle definition signals, setting forth the type of cycle the CPU 10 is executing on the bus 12. M/IO# selects a memory reference if high, or an I/O reference if low. D/C# says whether the access is for data (if high) or for code (id low); this signal can be used to differentiate between accessing instructions and accessing data. W/R# is the write/read control, specifying a write operation if high or a read operation if low. Lock# forces a condition where

TABLE A-continued
CONTROL BUS teh CPU 10 maintains control of the bus 12 and cannot be interrupted by another master.

ADS# is an address status signal, and indicates that new address and cycle defination information is available on the bus 12a and 12c; this signal begins every external access by the CPU 10.

READY# is a transfer acknowledge input to the CPU and terminates a cycle on the local bus 12 by signalling to the CPU 10 for a read cycle that the data on the bus 12 b is ready to be latched into the CPU or that a write has been completed or posted. Every CPU bus cycle must end with READY# asserted.

NA# is the next-address request, used to initiate address pipelining by indicating that the system is prepared to accept new values of address, byte enable, and cycle definition, even if the end of the current cycle has not been acknowledged on READY#.

HOLD and HLDA are bus arbitration signals, where HOLD is asserted as an input to the CPU 10 when another device requires control of the bus, and the CPU 10 asserts hold-acknowledge HLDA when it relinquishes control of the bus in response to HOLD.

INTR is a maskable interrupt request input to the CPU, and when asserted the CPU executes an interrupt acknowledge cycle in which an interrupt vector is latched into the CPU from the data bus 12b.

Clock Clk2 is the same clock for both the CPU 10 and the controller 11, and is divided by two internally to produce the internal clock Clk. In the wxample, the Clk frequency is perhaps 20-MHz, so the Clk2 frequency is 40-MHz.

BE0#-BE3# are Byte Enable signals defining which ones of the four bytes in the 32-bit doubleword on data bus 12b being accessed are wanted by the CPU 10. These signals are used in the 80386, but not in the 80386SX.

TABLE B

The Instruction Set:
The controller 11 of FIG. 4 executes the following instruction set:

ADD: There are three types of ADD instructions - ADD A,Rr = add one of the registers Rr of the register set in the RAM 66 to the contents of A, the accumulator 72; ADD A,@Rr = add the contents of a location in the data memory part of the RAM 66 selected by register Rr to contents of the accumulator 72; ADD A, sm data = add an immediate value in the instruction itself to the contents of the accumulator 72. All three of these ADD instructions also can be with a carry when the mnemonic is ADDC.

ANL: There are three types of AND instructions, like the ADD instructions - ANL A,Rr = perform an "AND" function of a register Rr with the contents of the accumulator 72, result to accumulator; ANL A,@Rr = same for a data memory location, and ANL A,#data = same for immediate value.

ORL: Again, three types of OR instructions - ORL A,Rr = OR the contents of a-register with the contents of the accumulator, result to accumulator; ORL A,@Rr = same for a data memory location, and ORL A,#data = same for an immediate value.

XRL: Exclusive OR instructions are of three types just like the ORL instructions - XRL A,Rr = Register, XRL A,@Rr = data memory, and XRL A,#data = immediate.

INC A: Increment the accumulator 72. Also, INC Rr is increment the register Rr, and INC @Rr is increment the data memory location pointed to by the contents of register Rr.

DEC A: Decrement the accumulator 72. Likewise, DEC Rr is decrement the register Rr.

CLR A: Clear the accumulator 72.

CPL A: Complement the accumulator.

SWAP A: Swap 4-bit nibbles contained in accumulator.

RL A: Rotate accumulator left; also there are rotate right, and rotate left and right through carry, instructions.

IN A,Pp: Input Pp, a selected one of the ports 76 or 77, to A, the accumulator 72.

OUT A,Pp: Output the accumulator A to a selected one of the ports 76 or 77, Pp.

ANL Pp,#data: Perform an AND function between immediate data and a selected one of the ports 76 or 77, result to the port.

ORL Pp,#data: Perform an OR function between immediate data and a selected one of the ports 76 or 77, result to the port.

IN A,DBB: Input the data bus buffer 79 to the accumulator 72 and clear the input buffer flag IBF in register 80.

OUT DBB,A: Output the contents of the accumulator 72 to the data bus buffer 78 and set the output buffer flag OBF.

MOV STS,A: Move the contents of bits 4-7 of the accumulator to bits 4-7 of the status register 80.

MOV A,Rr: Move the contents of register Rr of the RAM 66 to the accumulator 72. MOV Rr,A is the reverse.

MOV A,@Rr: Move the contents of the data memory 66 as addressed by the contents of register Rr to the accumulator. Similarly, MOV @Rr,A is the reverse.

MOV A,#data: Move the immediate data in the instruction to the accumulator.

MOV Rr,#data: Move immediate data to register Rr.

TABLE B-continued

The Instruction Set:
The controller 11 of FIG. 4 executes the following instruction set:

MOV @Rr,#data: Move immediate data to memory location.

MOV A,PSW: Move immediate data to program status word. The reverse is provided by the MOV PSW,A instruction.

XCH A,Rr: Exchange the accumulator with the register Rr.

XCH A,@Rr: Exchange the accumulator with the memory location which is addressed by the contents of Rr.

MOVP A,@A: Move the contents of the location in the current page of ROM 65 addressed by the contents of the accumulator to the accumulator.

MOVP3 A,@A: Same as MOVP but uses page-3 of ROM instead of current page.

MOV A,T: Read the contents of the timer/counter register 86, load to accumulator.

MOV T,A: Load the contents of the accumulator to the timer/counter register 86.

STRT: Start timer 86, counting clock cycles/32.

STRT CNT: Start counter register 86 counting inputs to Test1 pin 84.

STOP TCNT: Stop timer or counter.

EN I and DIS I: Enable and Disable the input buffer full IBF interrupt (not used int this example).

SEL RB0: Select register bank 0, bytes 0-7 of RAM 66 are used as registers 0-7.

SEL RB1: Select register band 1, bytes 24-31 of RAM 66 are used as register 0-7.

NOP: No operation.

CALL addr: Jump to subroutine starting at address "addr" in the ROM 65.

RET: Return to instruction following last CALL.

RETR: Return and restore status.

CLR C: Clear the carry flag. Similarly, CLR F0 is clear flag-0 and CLR F1 is clear flag-1.

CPC C: Complement the carry flag. Similarly CPL F0 or CLR F1 means clear the flag-0 or flag-1.

JMP addr: Jump unconditionally to the address "addr" in ROM 65. Similarly, JMPP @A is jump indirect, jump unconditionally to address contained in accumulator.

JC addr: conditional jump on carry = 1. Similarly, JNC addr is jump to address "addr" in ROM 65 if carry = 0.

JZ addr: conditional jump to address "addr" in ROM 65 if accumulator contents are zero. "JNZ addr" means same, but if accumulator content is not zero.

JT0 addr: Jump to address "addr" if Test0 = 1.

JNT0 addr: Jump to address "addr" if Test0 = 0.

JT1 addr: Jump to address "addr" if Test1 = 1.

JNT1 addr: Jump to address "addr" if Test1 = 0.

JF0 addr: Jump to address "addr" if F0 flag = 1.

JF1 addr: Jump to address "addr" if F1 flag = 1.

JTF addr: Jump to address "addr" if timer flag = 1

—JNIBF addr: Jump to address "addr" if IBF flag = 0, input buffer 79 is empty.

JOBF addr: Jump to address "addr" if OBF = 1, output buffer 78 has been loaded.

TABLE C

| CMOS RAM LOCATION | DEFINITION |
|---|---|
| 000036(hex) | NOT USED |
| 000037(hex) | SECOND CHECKSUM |
| 000038(hex) | PASSWORD BYTE 1 |
| 000039(hex) | PASSWORD BYTE 2 |
| 00003A(hex) | PASSWORD BYTE 3 |
| 00003B(hex) | PASSWORD BYTE 4 |
| 00003C(hex) | PASSWORD BYTE 5 |
| 00003D(hex) | PASSWORD BYTE 6 |
| 00003E(hex) | PASSWORD BYTE 7 |
| 00003F(hex) | FIRST CHECKSUM |

What is claimed is:

1. A method of operating a computer system, comprising the steps of:
   (a) storing a password and a pair of representations of said password in a non-volatile memory accessible by a CPU of said system;
   (b) upon power-on initialization of said system, accessing said non-volatile memory to check said password against one of said pair of representations, and, if a match is not found, to check said password against the other of said pair;
   (c) if a match is found in either of said checks, then writing the good one of the pair to the other or said pair, and comparing with said stored password a password entered by a user from a keyboard of said computer system, and if the passwords are the same, allowing normal operation of said system by said user to proceed, but, if the passwords do not agree, locking said user out of the system;
   (d) if a match is not found in either one of said checks, then zeroing said stored password and said representations and allowing normal operation of the system to proceed without entry of a password by the user.

2. A method according to claim 1 wherein said non-volatile memory is a CMOS RAM with a battery power supply.

3. A method according to claim 1 wherein said pair of representations are checksums of said stored password.

4. A method according to claim 1 including the step of preventing access to said non-volatile memory by said CPU, after said normal operation is allowed to proceed.

5. A method according to claim 4 wherein said step of preventing access includes writing to a control element in the I/O address space of said CPU.

6. A method of operating a computer system, comprising the steps of:
   (a) storing a data value and at least one representation of said data value in a non-volatile memory accessible by a CPU of said system;
   (b) upon power-on initialization of said system, accessing said non-volatile memory to check said data value against said at least one representation, and, if a match is not found, to again check said data value against said at least one representation;
   (c) if a match is found in either of said checks, then entering a first type of operation of said computer system including comparing a new data value accessed by said computer system to said stored data value;
   (d) if a match is not found in either one of said checks, then entering a second type of operation of the system.

7. A method according to claim 6 wherein said non-volatile memory is a CMOS RAM with a battery power supply.

8. A method according to claim 6 wherein said data value is a password, and said at least one representation includes a checksum of said stored data value.

9. A method according to claim 8 wherein if a match is found in either one of said checks, the representation for which a match is found is copied to the other of said representations.

10. A method according to claim 6 wherein said new data value is entered by a keyboard.

11. A method according to claim 6 including the step of preventing access by said CPU to said data value and said at least one representation upon entering said first type of operation.

12. A method according to claim 11 wherein said step of preventing access includes writing to a selected location of I/O space of said CPU.

13. A method according to claim 11 wherein said step of preventing access includes writing to an I/O port of said system, and said second type of operation includes disabling said I/O port.

14. A computer having a power-on password function for restricting access, comprising:
   (a) a CPU executing instructions fetched from a memory address space to perform operations on data stored in said memory address space, the CPU also having an I/O address space;
   (b) a restricted-access data storage area accessible by the CPU in said I/O address space, said restricted-access area being writable by said CPU, said restricted-access area storing password data used with said power-on password function and storing at least one representation of said password data for checking against said password data upon power-on initialization of the computer;
   (c) and means for locking out said CPU from access to said data storage area after said power-on initialization by writing to a selected location of said I/O address space.

15. A computer according to claim 14 wherein said means for locking out includes a latch set by writing to a I/O port location.

16. A computer according to claim 14 wherein said restricted access storage area is a battery-powered CMOS RAM.

17. A computer according to claim 14 including keyboard means for entering a password for checking against said password data, and means for halting computer operation if the password entered by the keyboard does not check with said password data.

18. A computer according to claim 17 including means for preventing said halting if said at least one representation does not check against said password data.

19. A computer having a power-on function for initialization, comprising:
   (a) a CPU executing instructions fetched from a memory address space to perform operations on data stored in said memory address space, the CPU also having an I/O address space;
   (b) a restricted-access data storage area accessible by the CPU in said I/O address space, said restricted-access area being writable by said CPU, said restricted-access area storing data used upon power-on initialization of the computer;
   (c) and means for locking out said CPU from access to said data storage area after said power-on initialization by writing to a selected location of said I/O address space.

20. A computer according to claim 19 wherein said means for locking out includes a latch set by writing to a I/O port location.

* * * * *